(12) United States Patent
Wei et al.

(10) Patent No.: US 8,610,781 B2
(45) Date of Patent: Dec. 17, 2013

(54) SYSTEM AND METHOD FOR LIGHT COMPENSATION IN A VIDEO PANEL DISPLAY

(71) Applicant: STMicroelectronics, Inc., Coppell, TX (US)

(72) Inventors: Dong Wei, San Jose, CA (US); Zhao Huang, San Jose, CA (US); Greg Neal, Morgan Hill, CA (US); Caba Moldvai, Dublin, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 13/666,024

(22) Filed: Nov. 1, 2012

(65) Prior Publication Data

US 2013/0107060 A1 May 2, 2013

Related U.S. Application Data

(60) Provisional application No. 61/554,604, filed on Nov. 2, 2011.

(51) Int. Cl.
*H04N 17/00* (2006.01)

(52) U.S. Cl.
USPC ............................................ 348/191; 348/189

(58) Field of Classification Search
USPC .......... 348/191, 187–189, 180; 345/102, 207; 324/760.01
IPC ............................................. H04N 17/00,17/02
See application file for complete search history.

(56) References Cited

U.S. PATENT DOCUMENTS 7,639,277 B2 * 12/2009 Shibuya et al. ............... 348/191
2012/0127320 A1 * 5/2012 Balogh .......................... 348/180

* cited by examiner

*Primary Examiner* — Sherrie Hsia
(74) *Attorney, Agent, or Firm* — Beyer Law Group, LLP

(57) ABSTRACT

A system for adjusting the light uniformity of a monitor. The system comprises a camera for capturing a test pattern image on a display of the monitor and a controller configured to select the test pattern image and to cause the monitor to display the selected test pattern image. The controller receives the captured image from the camera and compares pixel values from the captured image to known pixel values associated with the selected test pattern image. The selected test pattern image has an ideal uniform light distribution and the captured image has a non-uniform light distribution. In response to the comparison, the controller calculates a compensation light distribution that may be combined with the non-uniform light distribution to generate a resulting image on the display of the monitor having a resulting light distribution that approximates the ideal uniform light distribution.

27 Claims, 5 Drawing Sheets

SYSTEM AND METHOD FOR LIGHT COMPENSATION IN A VIDEO PANEL DISPLAY

CROSS-REFERENCE TO RELATED APPLICATION(S) AND CLAIM OF PRIORITY

The present application is related to U.S. Provisional Patent No. 61/554,604, filed Nov. 2, 2011, entitled "LIGHT UNIFORMITY COMPENSATION SYSTEM". Provisional Patent No. 61/554,604 is assigned to the assignee of the present application and is hereby incorporated by reference into the present application as if fully set forth herein. The present application hereby claims priority under 35 U.S.C. §119(e) to U.S. Provisional Patent No. 61/554,604.

TECHNICAL FIELD OF THE INVENTION

The present disclosure relates generally to the field of uniformity compensation in panel displays, and more specifically to a light uniformity compensation system for adjusting pixel light levels in an LCD panel display.

BACKGROUND OF THE INVENTION

Liquid crystal displays (LCDs) are increasingly being used for the display device in televisions, personal computers, and much state-of-the-art equipment, such as automotive navigation systems and simulation devices. One particular area where LCDs are increasingly being utilized is flat panel televisions. With the general acceptance of flat panel TV technology, there has been a large marketing and technology war over which technology is best, such as plasma display technology versus LCD display technology. Flat panel televisions are judged on thickness, weight, price, product lifetime, and image quality. Certain display technologies may be better in one area, such as image quality, but worse in another area, such as weight or price.

Typically, the image quality of a particular display technology is one of the most important factors taken into consideration when a buyer purchases a flat panel television. There are many different criteria to judge image quality. However, one important criterion is the light uniformity of the panel display. The light distribution of an LCD panel display typically is not uniform. There can be as much as 15% light fall off between different pixel areas on the display screen. Thus, the brightness is not uniform.

Therefore, there is a need in the art for methods and apparatuses for improving the light uniformity of a panel display.

SUMMARY OF THE INVENTION

A system for adjusting the light uniformity of a monitor is provided. The system comprises a camera for capturing a test pattern image on a display of the monitor and a controller configured to select the test pattern image and to cause the monitor to display the selected test pattern image. The controller receives the captured image from the camera and compares pixel values from the captured image to known pixel values associated with the selected test pattern image. The selected test pattern image has an ideal uniform light distribution and the captured image has a non-uniform light distribution. In response to the comparison, the controller calculates a compensation light distribution that may be combined with the non-uniform light distribution to generate a resulting image on the display of the monitor having a resulting light distribution that approximates the ideal uniform light distribution.

A method of adjusting the light uniformity of a monitor is provided. The method comprises: i) selecting a test pattern image and displaying the selected test pattern image on the monitor; ii) capturing in a camera a test pattern image on a display of the monitor; iii) comparing pixel values from the captured image to known pixel values associated with the selected test pattern image, wherein the selected test pattern image has an ideal uniform light distribution and the captured image has a non-uniform light distribution; and iv) in response to the comparison, calculating a compensation light distribution that may be combined with the non-uniform light distribution to generate a resulting image on the display of the monitor having a resulting light distribution that approximates the ideal uniform light distribution.

An integrated circuit comprising a system-on-a-chip for adjusting the light uniformity of a monitor is provided. The integrated circuit comprises a controller configured to select a test pattern image and to cause the monitor to display the selected test pattern image. The controller receives from a camera a captured image of the test pattern image on the display of the monitor and compares pixel values from the captured image to known pixel values associated with the selected test pattern image. Thee selected test pattern image has an ideal uniform light distribution and the captured image has a non-uniform light distribution. In response to the comparison, the controller calculates a compensation light distribution that may be combined with the non-uniform light distribution to generate a resulting image on the display of the monitor having a resulting light distribution that approximates the ideal uniform light distribution.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any processor, device, system or part thereof that controls at least one operation. Such a controller may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video display device and production facility.

The methods and apparatuses described herein for performing light uniformity compensation correct the pixel value non-uniformity described previously. The described methods and apparatuses perform compensation by modifying individual pixel values in opposite directions (i.e., either increasing or decreasing) using a scaling factor or offset value to achieve uniformity across a display panel. The scaling factors or offset values are then stored in a memory associated with the display panel. Thus, it is possible to make a good panel have a high degree of uniformity, which is useful in certain applications (e.g., the medical field). It is also possible to make a cost-effective, mid-range display panel that has a good degree of uniformity.

Figure 1:
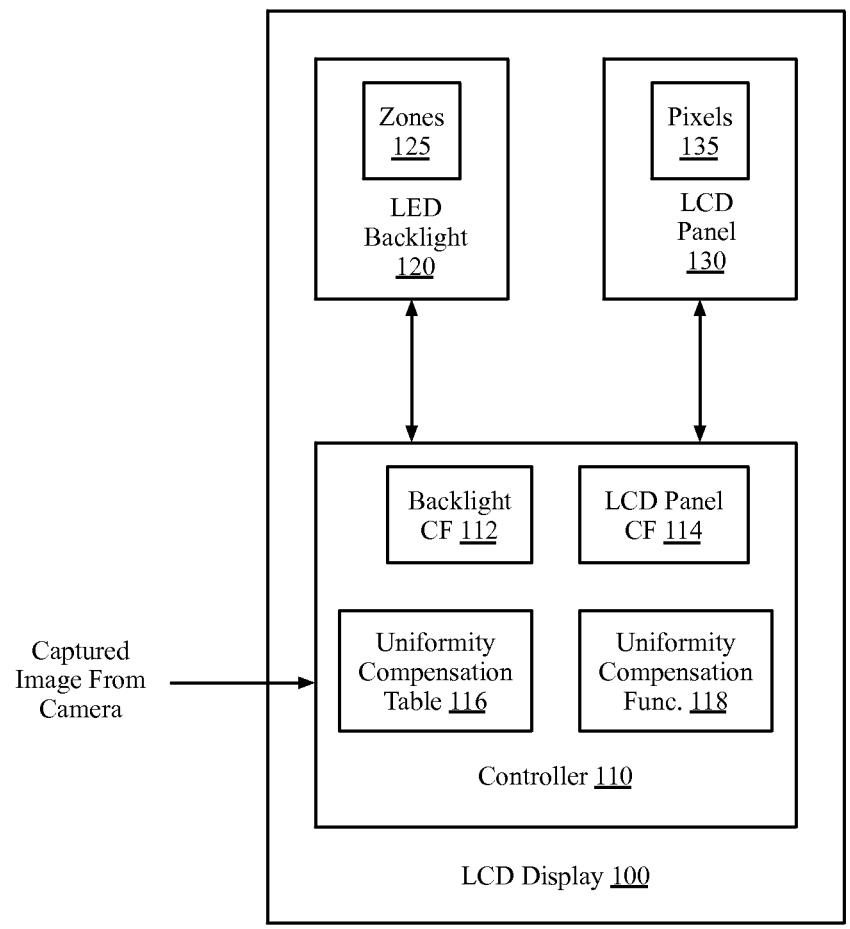
FIG. 1 illustrates a block diagram of a LCD monitor according to one embodiment.

FIG. 1 illustrates a block diagram of liquid crystal display (LCD) monitor 100 in accordance with the described embodiments. LCD monitor 100 comprises controller 110, light-emitting diode (LED) backlight 120 and LCD panel 130. Controller 110 comprises backlight control function 112, LCD panel control function 114, uniformity compensation table 116, and uniformity compensation function 118. LED backlight 120 may include a number of LEDs arranged in zones 125. Each zone can include one or more LEDs. The LEDs in each zone can be individually controlled to allow an amount of light emitted from each zone to be varied from zone to zone. Backlight control function 112 of controller 110 can be used to determine light levels for each zone.

LED backlight 120 illuminates LCD panel 130. LCD panel 130 comprises a number of pixels 135. At each pixel location on LCD panel 130, the opaqueness of each pixel can be controlled to affect an amount of light emitted from LED backlight 120 that is transmitted through the LCD panel at each pixel location. LCD panel control function 114 controls the opaqueness of each pixel. A control signal generated by controller 110 that is used to configure the opaqueness of each pixel in LCD panel 130 may be referred to as a pixel setting. By varying the pixel setting of each of pixels 135, an image may be formed on LCD panel 130. The image formed using pixels 135 and the associated pixel setting for each pixel can be determined from the image data, such as a television signal, received by controller 110.

The amount of light emitted through LCD panel 130 at each pixel location can depend on how opaque a pixel is and an amount of light emitted from LED backlight 120 that reaches the pixel location from each zone of LED backlight 120. Thus, the amount of light of light emitted through the LCD panel at a pixel location can be changed by: 1) backlight control function 112 changing an amount of light reaching a particular pixel location from LED backlight 120; and/or 2) LCD panel control function 114 changing the opaqueness of the pixel at the particular pixel location.

According to the principles of the present disclosure, uniformity compensation function 118 and uniformity compensation table 116 are configured to perform light uniformity compensation in cooperation with backlight control function 112 and/or LCD panel control function 114. Uniformity compensation function 118 may comprise uniformity compensation software executed by controller 110. Controller 110 displays a pre-determined test pattern image having a selected luminance and chrominance (i.e., known pixel settings) on display panel 130. An external camera takes a picture of display panel 130 while the pre-determined image is displayed. Controller 110 receives the captured image from the external camera. Uniformity compensation function 118 then compares the luminance and chrominance of the pixels in the captured image to the known pixel settings and calculates a scaling factor or offset value for each pixel in order to achieve light uniformity. The calculated scaling factors or offset values are then stored in uniformity compensation table 116. In an advantageous embodiment, controller 110 is implemented as a single integrated circuit in a system-on-a-chip (SoC) design.

Figure 2:
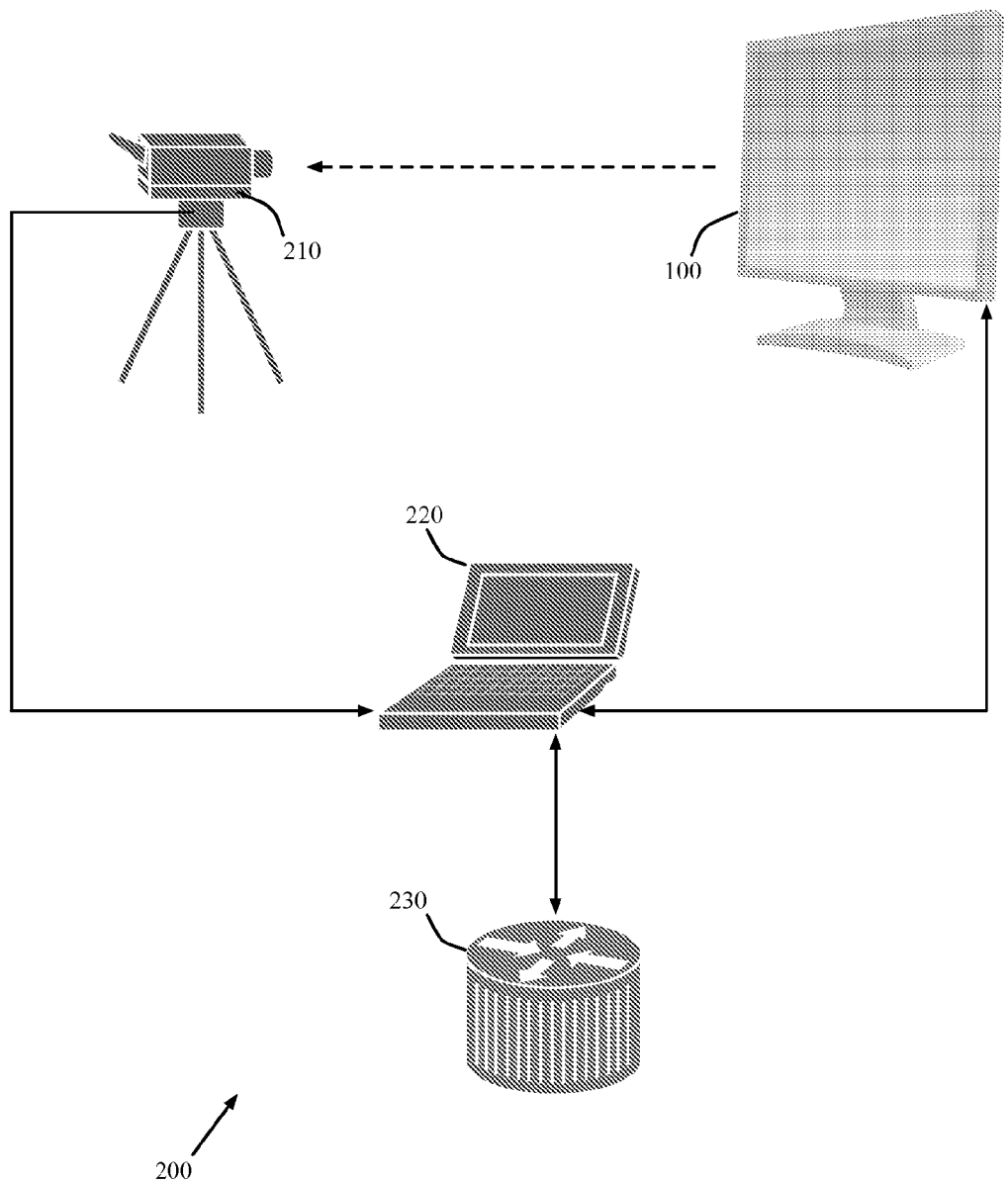
FIG. 2 illustrates a light uniformity compensation system according to one embodiment of the disclosure.

FIG. 2 illustrates light uniformity compensation system 200 according to one embodiment of the disclosure. Light uniformity compensation system 200 comprises LCD monitor 100, camera 210, (optional) computer 220 and database 230. In one embodiment, camera 210 may comprise an industrial grade camera, such as a 2D color meter camera, that capture an image on LCD monitor 100. In another embodiment, camera 210 used may be a lower cost, monochrome CCD camera. In still another embodiment, camera 210 may be a consumer-grade SLR camera. An advantage of the disclosed light uniformity compensation system is that a high degree of uniformity compensation may be achieved using low-cost components, such as a lower cost camera.

Another component of the system comprises LCD monitor 100, described above in FIG. 1, which includes a suitable chip set, for example, an Athena chip set from ST Microelectronics. Light uniformity compensation system 200 may optionally comprise an external control computing device or PC 220 that performs at least some of the functions of uniform compensation function 118. In the embodiment illustrated in FIG. 1, the control computing capability and requirements are implemented in LCD monitor 110, thus eliminating the need for an external control PC 220.

Figure 3:
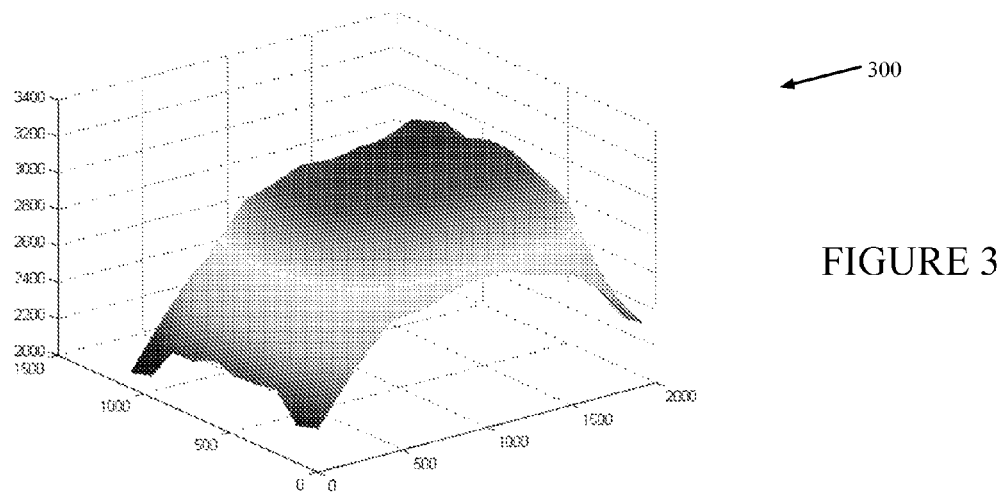
FIG. 3 illustrates an original, non-uniform light distribution captured by a camera according to an exemplary embodiment of the disclosure.
Figure 4:
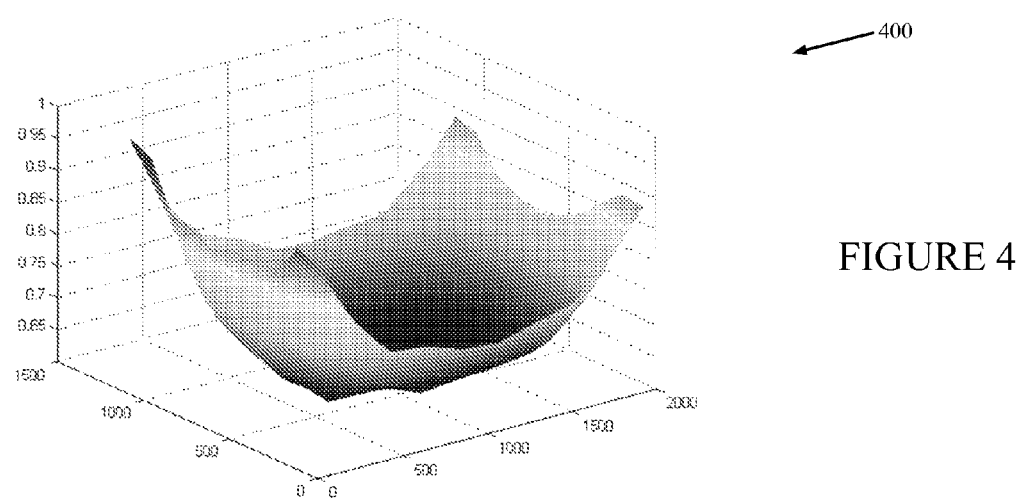
FIG. 4 illustrates a compensation light distribution according to an exemplary embodiment of the disclosure.
Figure 5:
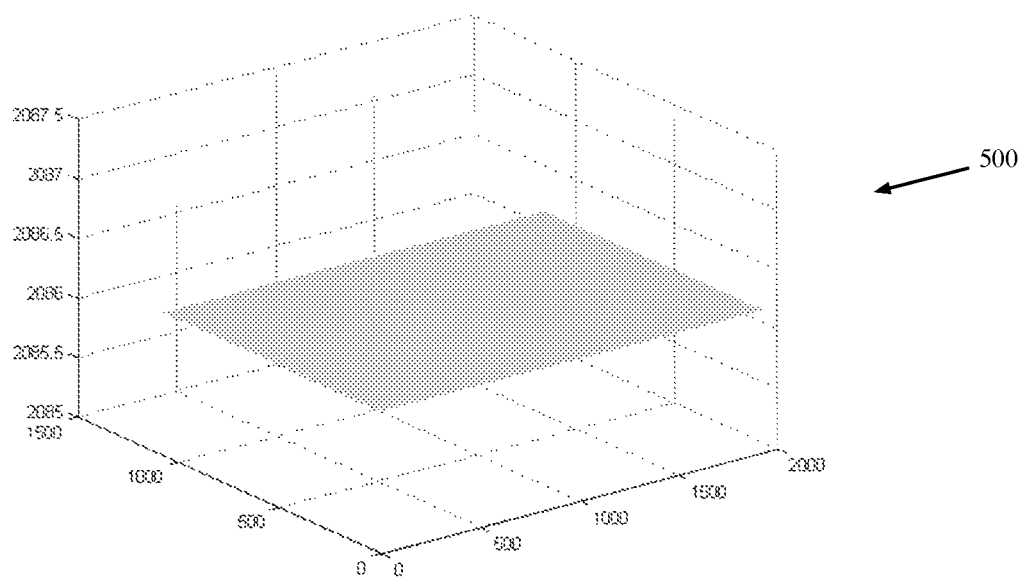
FIG. 5 illustrates a resultant uniform light distribution according to an exemplary embodiment of the disclosure.

FIG. 3 illustrates original, non-uniform light distribution 300 captured by camera 210 according to an exemplary embodiment of the disclosure. FIG. 4 illustrates compensation light distribution 400 according to an exemplary embodiment of the disclosure. FIG. 5 illustrates resulting uniform light distribution 500 that is achieved by combining compensation light distribution 400 in FIG. 4 with original, non-uniform compensation light distribution 300 in FIG. 3 according to an exemplary embodiment of the disclosure. It should be noted that resulting uniform light distribution 500 is an idealized representation and is not to scale. In a real-life system, some divergence from a perfectly flat result will occur.

According to an embodiment of the present disclosure, compensation light distribution 400 is factored in with original, non-uniform light distribution 300 to arrive at a more uniform distribution. In one embodiment, compensation light distribution 400 may comprise a plurality of pixel scaling factors, where each pixel scaling factor is associated with a pixel 135 on LCD panel 130. Each pixel scaling factor is determined by comparing each measured pixel value in original, non-uniform light distribution 300 captured by camera 210 to the idealized pixel value in resulting uniform light distribution 500. Compensation light distribution 400 is stored in uniformity compensation table 116. Thereafter, whenever LCD panel 130 displays a desired image, the pixel scaling factors in uniformity compensation table 116 are multiplied by the corresponding pixel setting values in the desired image to give an improved resulting image based on a more uniform light distribution. In an alternate embodiment, compensation light distribution 400 may comprise positive or negative pixel offset values that are added to the corresponding measured pixel setting values in original, non-uniform light distribution 300 in order to produce resulting pixel setting values that have uniform (or near uniform) values of luminance and chrominance.

Also, the pixel scaling factors in compensation light distribution 400 may also be saved in database 230. In a factory environment, the compensation light distribution 400 that is calculated for LCD monitor 100 may be retrieved from database 230 and used to program the uniformity compensation tables 116 of other LCD monitors of the same type or model as LCD monitor 100.

The uniformity compensation software (i.e., uniformity compensation function 118) and other components of the system use, in one embodiment, unique filtering mechanisms in the raw image clean-up stage of the compensation process. In one embodiment, two or more 2D low-pass filters of 172-taps or higher may be used. These filters are used at different stages of the image processing. In other embodiments, filters having different tap values may be used. Another type of filter that is used is a lens optical distortion filter that restores the optical distortion of the lens. That is, it corrects the optical distortion of the lens.

Another aspect of the raw image clean-up process is edge determination. Edge determination filtering allows the positioning of the display panel to be calibrated to be flexible in the picture frame. For example, the display panel may be angled or tilted in certain ways while light uniformity compensation is performed using the system of the present invention.

Two types of uniformity compensation may be performed: 1) luminance uniformity compensation and 2) chrominance white point uniformity compensation. For luminance uniformity compensation, the compensation factor is the same for red, green and blue channels. Primary chromaticity and white point are not affected. For chrominance white point uniformity compensation, the compensation factor is different for red, green and blue channels, but red, green and blue channels are independent. Primary chromaticity is not affected, but white point uniformity is compensated.

In one embodiment of the present invention, measurements for luminance and color uniformity (metrics data) may be used in conjunction with human perception factors. That is, Delta E, used to measure the difference in light distribution, is not the sole factor used to achieve uniform light distribution in the present invention. In the described embodiment, uniform light distribution is not only highly uniform (i.e., high performance), but also desirable or friendly to the human eye. Thus, the final light distribution may take into account human perception factors. Human perception typically favors images that have similar chromaticity or similarity with respect to color. The human eye prefers this to images that have smaller Delta E values, which, in theory, provide a more uniform light distribution.

A smaller Delta E is a higher performance metric (measurement), but this is not necessarily better for human perception. For example, two spots on a display may have small readings on Delta E, but significantly different chromaticity. In another scenario, two spots may have larger readings on Delta E, but small differences in chromaticity. The second scenario is more human-eye friendly because it takes into consideration color differences. This is only one example of human perception considerations that may be used to modify the calculated measurements. There may be a number of human perception considerations that are taken into consideration to potentially adjust the actual measurements.

Figure 6:
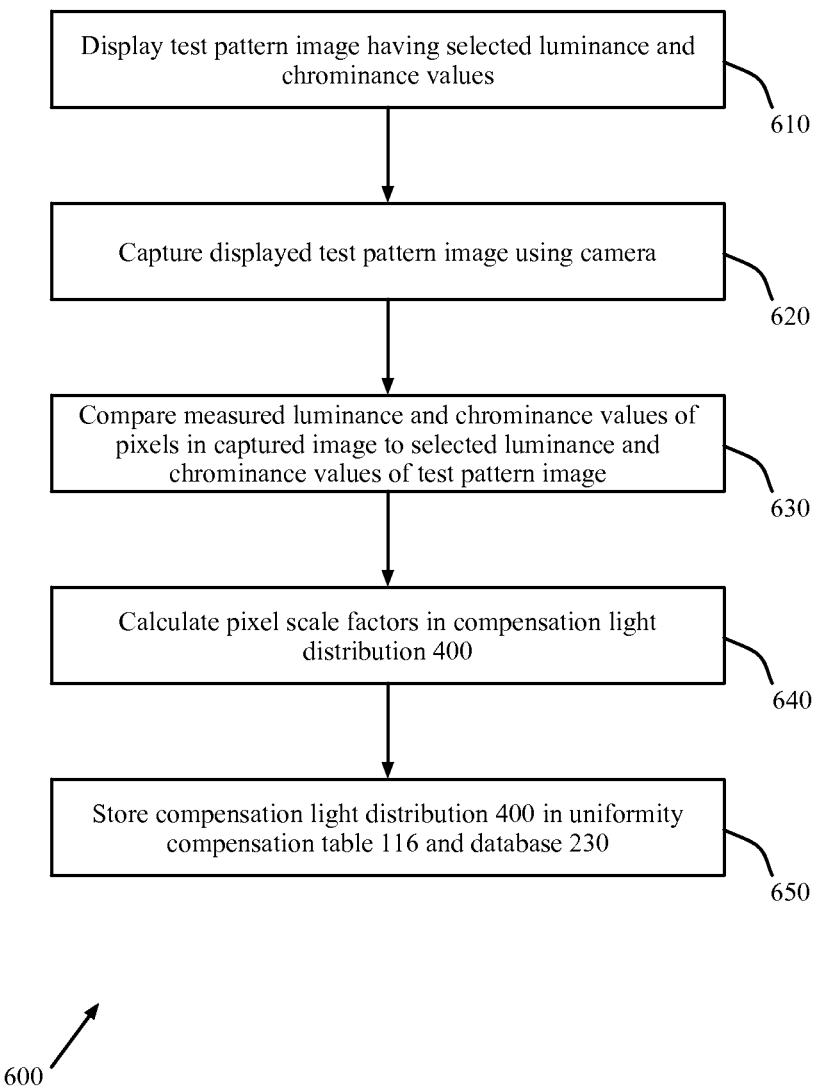
FIG. 6 is a flow diagram illustrating the operation of a light uniformity compensation system according to an exemplary embodiment of the disclosure.

FIG. 6 depicts flow diagram 600, which illustrates the operation of light uniformity compensation system 200 according to an exemplary embodiment of the disclosure. Initially, controller 110 in LCD monitor 100 displays a test pattern image having selected luminance and chrominance values (step 610). Ideally, the text pattern image has an ideal uniform light distribution when displayed on LCD monitor 100. Next, camera 210 captures the displayed test pattern image on monitor 100. The original captured test pattern image has a non-uniform light distribution. The captured image is transferred to controller 110 in monitor 100 or, alternatively, to PC 220 (step 620).

Controller 110 (or PC 220) then compares the measured luminance and chrominance values of pixels in the captured image to the known, selected luminance and chrominance values of the test pattern image (step 630). Next, controller 110 executes uniformity compensation function 118 in order to calculate pixel scale factors in compensation light distribution 400. Alternatively, PC 220 may execute a similar uniformity compensation function in order to create compensation light distribution 400 (step 640). Finally, controller 110 (or PC 220) stores compensation light distribution 400 in uniformity compensation table 116. Additionally, PC 220 may store compensation light distribution 400 in database 230 in order to be later transferred into the uniformity compensation tables of other monitors that are similar to monitor 100 (step 650). This avoids having to calibrate the light uniformity of every monitor individually.

When the known selected luminance and chrominance values of the pixels in the selected test pattern image are multiplied by the pixel scale factors in the compensation light distribution 400, the resulting pixels values in the resulting uniform light distribution 500 will produce a resulting image on monitor 100 that has a more uniform light distribution that more closely approximates the ideal uniform light distribution of the selected test pattern image.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for adjusting the light uniformity of a monitor comprising:

a camera for capturing a test pattern image on a display of the monitor; and a controller configured to select the test pattern image and to cause the monitor to display the selected test pattern image, wherein the controller is further configured to receive the captured image from the camera and to compare pixel values from the captured image to known pixel values associated with the selected test pattern image, wherein the selected test pattern image has an ideal uniform light distribution and the captured image has a non-uniform light distribution, and wherein, in response to the comparison, the controller is further configured to calculate a compensation light distribution that may be combined with the non-uniform light distribution to generate a resulting image on the display of the monitor having a resulting light distribution that approximates the ideal uniform light distribution.

2. The system as set forth in claim 1, wherein the compensation light distribution comprises a plurality of pixel scale factors, wherein each pixel scale factor is multiplied by a pixel value from the captured image to produce a resulting pixel value associated with the resulting light distribution.

3. The system as set forth in claim 1, wherein the compensation light distribution comprises a plurality of pixel offset values, wherein each pixel offset value is added to a pixel value from the captured image to produce a resulting pixel value associated with the resulting light distribution.

4. The system as set forth in claim 1, wherein the controller is further configured to store the compensation light distribution in a memory of the monitor, wherein the monitor uses the compensation light distribution to modify other images to be displayed on the monitor.

5. The system as set forth in claim 1, wherein the controller is disposed in the monitor.

6. The system as set forth in claim 1, wherein the controller is disposed in a processing device that is external to the monitor.

7. The system as set forth in claim 1, further comprising a database for storing the compensation light distribution for subsequent use in other monitors.

8. A method of adjusting the light uniformity of a monitor comprising:
    selecting a test pattern image and displaying the selected test pattern image on the monitor;
    capturing in a camera a test pattern image on a display of the monitor;
    comparing pixel values from the captured image to known pixel values associated with the selected test pattern image, wherein the selected test pattern image has an ideal uniform light distribution and the captured image has a non-uniform light distribution; and
    in response to the comparison, calculating a compensation light distribution that may be combined with the non-uniform light distribution to generate a resulting image on the display of the monitor having a resulting light distribution that approximates the ideal uniform light distribution.

9. The method as set forth in claim 8, wherein the compensation light distribution comprises a plurality of pixel scale factors, wherein each pixel scale factor is multiplied by a pixel value from the captured image to produce a resulting pixel value associated with the resulting light distribution.

10. The method as set forth in claim 8, wherein the compensation light distribution comprises a plurality of pixel offset values, wherein each pixel offset value is added to a pixel value from the captured image to produce a resulting pixel value associated with the resulting light distribution.

11. The method as set forth in claim 8, further comprising:
    storing the compensation light distribution in a memory of the monitor, wherein the monitor uses the compensation light distribution to modify other images to be displayed on the monitor.

12. The method as set forth in claim 8, wherein the method is performed by a controller disposed in the monitor.

13. The method as set forth in claim 8, wherein the method is performed by a controller disposed in a processing device that is external to the monitor.

14. The method as set forth in claim 8, further comprising:
    storing the compensation light distribution in a database for subsequent use in other monitors.

15. A integrated circuit comprising a system for adjusting the light uniformity of a monitor, the integrated circuit comprising:
    a controller configured to select a test pattern image and to cause the monitor to display the selected test pattern image, wherein the controller is further configured to receive from a camera a captured image of the test pattern image on the display of the monitor and to compare pixel values from the captured image to known pixel values associated with the selected test pattern image, wherein the selected test pattern image has an ideal uniform light distribution and the captured image has a non-uniform light distribution, and wherein, in response to the comparison, the controller is further configured to calculate a compensation light distribution that may be combined with the non-uniform light distribution to generate a resulting image on the display of the monitor having a resulting light distribution that approximates the ideal uniform light distribution.

16. The integrated circuit as set forth in claim 15, wherein the compensation light distribution comprises a plurality of pixel scale factors, wherein each pixel scale factor is multiplied by a pixel value from the captured image to produce a resulting pixel value associated with the resulting light distribution.

17. The integrated circuit as set forth in claim 15, wherein the compensation light distribution comprises a plurality of pixel offset values, wherein each pixel offset value is added to a pixel value from the captured image to produce a resulting pixel value associated with the resulting light distribution.

18. The integrated circuit as set forth in claim 15, further comprising a memory, wherein the controller is further configured to store the compensation light distribution in the memory and wherein the controller uses the compensation light distribution to modify other images to be displayed on the monitor.

19. The integrated circuit as set forth in claim 15, wherein the integrated circuit is disposed in the monitor.

20. The integrated circuit as set forth in claim 15, wherein the integrated circuit is disposed in a processing device that is external to the monitor.

21. A video monitor comprising:
    a light-emitting diode (LED) backlight;
    a liquid crystal display (LCD) panel; and
    a controller configured to perform light uniformity compensation, the controller comprising a uniformity compensation function and a uniformity compensation table, wherein the uniformity compensation table contains a compensation light distribution generated by:
        displaying on the video monitor a selected test pattern image;
        capturing an image of the displayed test pattern image;
        comparing pixel values from the captured image to known pixel values associated with the selected test pattern image, wherein the selected test pattern image has an ideal uniform light distribution and the captured image has a non-uniform light distribution; and
        in response to the comparing, calculating the compensation light distribution such that the compensation light distribution may be combined with the non-uniform light distribution to generate a resulting image on the video monitor having a resulting light distribution that approximates the ideal uniform light distribution.

22. The video monitor as set forth in claim 21, wherein the compensation light distribution comprises a plurality of pixel scale factors, wherein each pixel scale factor is multiplied by a pixel value from the captured image to produce a resulting pixel value associated with the resulting light distribution.

23. The video monitor as set forth in claim 21, wherein the compensation light distribution comprises a plurality of pixel offset values, wherein each pixel offset value is added to a pixel value from the captured image to produce a resulting pixel value associated with the resulting light distribution.

24. The video monitor as set forth in claim 21, wherein the comparing pixel values from the captured image to known pixel values associated with the selected test pattern image is performed by the controller.

25. The video monitor as set forth in claim 21, wherein the comparing pixel values from the captured image to known pixel values associated with the selected test pattern image is performed by a second controller external to the video monitor.

26. The video monitor as set forth in claim 21, wherein the calculating the compensation light distribution is performed by the controller.

27. The video monitor as set forth in claim 21, wherein the calculating the compensation light distribution is performed by a second controller external to the video monitor.

\* \* \* \* \*